United States Patent [19]

Brooks et al.

[11] 4,160,866

[45] Jul. 10, 1979

[54] CARBAMATES

[75] Inventors: John L. Brooks; Richard Budziarek; David J. Harper, all of Manchester, England

[73] Assignee: Imperial Chemical Industries Limited, London, England

[21] Appl. No.: 854,252

[22] Filed: Nov. 23, 1977

Related U.S. Application Data

[63] Continuation-in-part of Ser. No. 767,331, Feb. 10, 1977, abandoned.

[30] Foreign Application Priority Data

Apr. 30, 1976 [GB] United Kingdom ............... 17704/76

[51] Int. Cl.² ............................................ C07C 125/06
[52] U.S. Cl. ........................................ 560/25; 560/158
[58] Field of Search ................................... 560/25, 158

[56] References Cited

U.S. PATENT DOCUMENTS 4,073,800  2/1978  Brooks et al. ..................... 560/29

Primary Examiner—James O. Thomas, Jr.
Assistant Examiner—G. T. Breitenstein
Attorney, Agent, or Firm—Cushman, Darby & Cushman

[57] ABSTRACT

Carbamate compounds of the formula:

$$R_1-O.CO.NHO.CO.X.CO.OHN.CO.O-R_1 \qquad (1)$$

in which CO.X.CO is the diacyl radical of a polybasic carboxylic acid, and $R_1$ is an optionally substituted hydrocarbyl radical; more particularly, X is a member of the group consisting of a direct link, $C_1$ to $C_4$ alkylene groups, $C_2$ to $C_3$ alkenylene, o-phenylene and p-phenylene and $R_1$ is a member of the group consisting of $C_1$ to $C_{18}$ alkyl, phenyl, chlorophenyl, nitrophenyl, cyclohexyl and benzyl.

These carbamates are useful as cross-linking agents in natural rubbers or synthetic rubbers based on isoprene or butadiene polymers.

4 Claims, No Drawings

CARBAMATES

This application is a continuation-in-part of application Ser. No. 767,331, filed Feb. 10, 1977, now abandoned.

This invention relates to new carbamate compounds and is more particularly concerned with new N-acyloxy carbamate compounds useful as cross-linking or chain-extending agents for polymers.

According to the invention there are provided carbamate compounds of the formula:

$$R_1\text{—O.CO.NHO.CO.X.CO.OHN.CO.O—}R_1 \quad (1)$$

in which CO.X.CO is the diacyl radical of a polybasic carboxylic acid, and $R_1$ is an optionally substituted hydrocarbyl radical.

As examples of hydrocarbyl radicals represented by $R_1$ there may be mentioned alkyl, cyclo alkyl, alkenyl, aralkyl and aryl groups which may be substituted, e.g. by OH or $CO_2H$ but more especially by substituents free from labile hydrogen atoms, e.g. dialkylamino, $NO_2$, tertiary alkyl, acylamino, etherified hydroxyl, alkyl- or aryl-sulphone, alkyl- or aryl-carbonyl, esterified carboxyl or esterified sulphonic acid groups. The preferred class of compounds is that in which $R_1$ is chosen from $C_1$ to $C_{18}$ alkyl, phenyl, chlorophenyl, nitrophenyl, cyclohexyl and benzyl, and X is chosen from a direct link, alkylene of $C_1$ to $C_4$, alkenylene of $C_2$ or $C_3$ and o- and p-phenylene.

As particular examples of compounds of formula (1) there may be mentioned:
di-[N-(n-butoxycarbonyl)amino]succinate
di-[N-(n-octyloxycarbonyl)amino]malonate
di-[N-(i-butoxycarbonyl)amino]oxalate
di-[N-(n-dodecyloxycarbonyl)amino]adipate
di-[N-(n-octadecyloxycarbonyl)amino]adipate
di-[N-(i-propoxycarbonyl)amino]maleate
di-[N-(ethoxycarbonyl)amino]mesaconate
di-[N-(phenoxycarbonyl)amino]fumarate
di-[N-(benzyloxycarbonyl)amino]glutarate
di-[N-(n-butoxycarbonyl)amino]terephthalate
di-[N-(cyclohexyloxycarbonyl)amino]glutarate
di-[N-(n-decyloxycarbonyl)amino]maleate
di-[N-(n-octyloxycarbonyl)amino]fumarate
di-[N-(n-octadecyloxycarbonyl)amino]terephthalate
di-[N-(phenoxycarbonyl)amino]terephthalate
di-[N-(p-methylphenoxycarbonyl)amino]phthalate
di-[N-(p-nitrophenoxycarbonyl)amino]phthalate
di-[N-(o-chlorophenoxycarbonyl)amino]terephthalate
di-[N-(phenoxycarbonyl)amino]adipate
di-[N-(ethoxycarbonyl)amino]terephthalate
di-[N-(methoxycarbonyl)amino]adipate, and
di-[N-(n-butoxycarbonyl)amino]malonate.

The compounds of formula (1) can be obtained by condensing a chloro-formate ester of the formula:

$$R_1\text{—O—CO—Cl} \quad (2)$$

with hydroxylamine and reacting the resulting N-hydroxy carbamic ester of formula:

$$R_1\text{—O—}\underset{\underset{O}{\|}}{C}\text{—NHOH} \quad (3)$$

with the anhydride, lower alkyl, e.g. methyl or ethyl, ester or acyl halide of a polybasic carboxylic acid of formula:

$$X(CO_2H)_2 \quad (4)$$

As examples of chloroformate esters of formula (2) there may be mentioned:
methyl, ethyl, n-propyl, n-butyl, n-octyl, n-nonyl, n-dodecyl and n-octadecyl chloroformates
methoxyethyl chloroformate
methoxypoly(ethyleneoxy)ethyl chloroformate
benzyl chloroformate
phenyl chloroformate
cyclohexyl chloroformate As examples of polybasic acids of formula (4) there may be mentioned:
phthalic, iso-phthalic and terephthalic acids
3- and 4-nitrophthalic acids
oxalic acid
malonic acid
succinic acid
glutaric acid
adipic acid.

As examples of polymers which may be cross-linked or chain-extended by the carbamates of the invention there may be mentioned natural and synthetic polyisoprene and other isoprene-containing copolymers, butadiene, and butadiene copolymers.

The carbamates of formula (1) may be incorporated into the polymer by blending with the polymer in any conventional manner, for example on a two-roll mill. The polymer is thereafter shaped, for example in a mould, and heated to a temperature above 50° C., and preferably between 100° C. and 250° C., to bring about cross-linking. The cross-linking may also be initiated after mixture by exposure to ultra-violet light.

The polymer mixtures may also contain other conventional additives; as examples of such additives, there may be mentioned fillers, e.g. silica, carbon black, diatomaceous earths, pigments, antioxidants, curing accelerators and anti-scorch agents.

In particular there may be added tertiary amines, or additives of the above kind which contain tertiary amino groups—e.g. tetramethyl - thiourea or zinc diethyl dithiocarbamate.

The amount of carbamate of formula (1) used will normally be from 0.1 part to 10 parts by weight per 100 parts by weight of the polymer; the use of other proportions however is possible.

The invention is illustrated by the following examples in which parts and percentages are by weight.

EXAMPLE 1

A solution of 276.4 parts of potassium carbonate in 300 parts of water and 217 parts of ethylchloroformate are added over 1.5 hours at equivalent rates of 139 parts of ground hydroxylammonium chloride, stirred in 1000 parts of diethyl ether at 0°–5° C. The reaction mixture is stirred a further 12 hours at 20°–25° C. and then filtered to remove potassium chloride. The ether layer is separated, washed with 25 parts of water, dried and filtered. The filtrate is evaporated to constant weight at 30° C. under reduced pressure to give 154 parts of ethyl N-hydroxycarbamate as a colourless oil.

Analysis: Found: C, 34.1; H, 6.8; N, 13.2%. $C_3H_7NO_3$ requires C, 34.2; H, 6.7; N, 13.3%.

31 Parts of ethyl N-hydroxycarbamate are added to 30.4 parts of ground terephthaloylchloride stirred in 100 parts of dioxan at 5°–10° C. followed by 30.3 parts of triethylamine added over 1 hour at 0°–5° C. The reaction mixture is stirred for a further 3 hours at 5°–10° C. followed by 24 hours at 20°–25° C. and is then added to 1000 parts water to give a white solid. The solid is filtered off, washed and dried to give 42 parts of di-[N-(ethoxycarbonyl)amino]terephthalate as a white solid, m.p. 130° C.

Analysis: Found C, 50.2; H, 4.3; N, 7.3%. $C_{14}H_{16}N_2O_8$ requires C, 49.5; H, 4.7; N, 8.2%.

EXAMPLE 2

36.6 Parts of adipoyl chloride are added to 42 parts of ethyl N-hydroxycarbamate stirred in 500 parts of ether at 0°–5° C. and then 40.4 parts of triethylamine are added over 1 hour at 0°–5° C. The reaction mixture is stirred a further 2 hours at 5°–10° C. followed by 18 hours at 20°–25° C. and is then filtered to remove triethylammonium chloride. The ether layer is separated, washed with 50 parts water, dried, filtered and the filtrate evaporated to constant weight at 30° C. under reduced pressure to give 52 parts of di-[N-(ethoxycarbonyl)amino]adipate as a white solid, m.p. 60° C.

Analysis; Found: C, 44.6; H, 6.5; N, 8.8%. $C_{12}H_{20}N_2O_8$ requires C, 45.0; H, 6.3; N, 8.7%.

EXAMPLE 3

42 parts of ethyl N-hydroxy carbamate prepared by the method described in Example 1 are stirred in 300 parts of diethylether maintained at 0°–5° C. and 30.4 parts of fumaroyl chloride are added. 40.4 parts of triethylamine are added during 2 hours and the mixture is stirred for a further 3 hours at 5° to 10° C. followed and 18 hours at 25° C. The mixture is then filtered and the filtrates washed twice with 100 parts water, dried, filtered and evaporated to constant weight at 40° C. under reduced pressure to give 37 parts of di-[N-(ethoxycarbonyl)amino]fumarate as a white powder m.p. 120° C.

Analysis: Found: C 41.7; H 5.1; N 9.7%. $C_{10}H_{14}N_2O_8$ requires: C 41.5; H 4.8; N 10.0%.

Use of the carbamates is illustrated by the following:

Crosslinking of SBR

The masterbatch detailed below was prepared in a conventional manner in an internal mixer.

|  | parts by weight |
|---|---|
| Solution polymerized Styrene Butadiene Rubber ("Solprene" 1204) | 100 |
| High Abrasion Furnace Black (N 330) | 50 |

Curatives as detailed in Table I were then added to separate portions of this masterbatch on a two-roll mill at 70° C.

Table I

| Mix No. | 1 | 2 | 3 | 4 | 5 | 6 | 7 |
|---|---|---|---|---|---|---|---|
| Zinc oxide | 5 | — | — | — | — | — | — |
| Stearic acid | 1 | — | — | — | — | — | — |
| N-cyclohexyl-2-benzthiazylsulphenamide | 1.2 | — | — | — | — | — | — |
| sulphur | 1.8 | — | — | — | — | — | — |
| Example 1 | — | 4.0 | — | — | 4.0 | — | — |
| Example 2 | — | — | 4.0 | — | — | 4.0 | — |
| Example 3 | — | — | — | 4.0 | — | — | 4.0 |
| Zinc diethyl dithiocarbamate | — | — | — | — | 4.0 | 4.0 | 4.0 |

The compounded stocks were tested for scorch/cure characteristics using an Oscillating Disc Rheometer. The results are given in Table II.

Table II

| Oscillating Disc Rheometer at 190° C. | Mix No. | | | | | | |
|---|---|---|---|---|---|---|---|
| | 1 | 2 | 3 | 4 | 5 | 6 | 7 |
| Peak torque (in lbs) | 104 | 118 | 78 | 67 | 68 | 39 | 26 |
| Time (minutes) to 95% crosslinking | 3 | 14.5 | 25 | 25 | 10.4 | 24 | 17 |

We claim:

1. A carbamate compound of the formula:

$$R_1-O.CO.NHO.CO.X.CO.OHN.CO.O-R_1 \quad (1)$$

in which X is a member of the group consisting of a direct link, $C_1$ to $C_4$ alkylene groups, $C_2$ to $C_3$ alkenylene, o-phenylene and p-phenylene and $R_1$ is a member of the group consisting of $C_1$ to $C_{18}$ alkyl, phenyl, chlorophenyl, nitrophenyl, cyclohexyl and benzyl.

2. A carbamate compound as claimed in claim 1 of the formula:

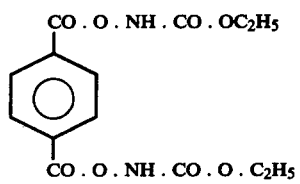

3. A carbamate compound as claimed in claim 1 of the formula:

$H_5C_2O.CO.NH.O.CO.(CH_2)_4.CO.O.NH.CO.OC_2H_5$

4. A carbamate compound as claimed in claim 1 of the formula:

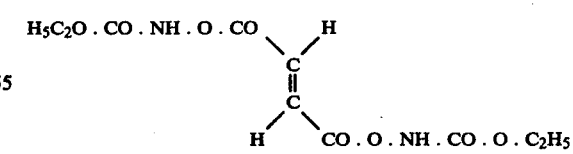

* * * * *